United States Patent Office 3,253,985

Patented May 31, 1966

1

2

3,253,985
PROCESS FOR APPLYING GELLED COMPOSITIONS OF INSECTICIDES

Keith G. Seymour and Billy G. Harper, Lake Jackson, Tex., assignors to The Dow Chemical Company, Midland, Mich., a corporation of Delaware No Drawing. Filed Mar. 18, 1965, Ser. No. 440,927
3 Claims. (Cl. 167—42)

This application is a continuation-in-part of patent application Serial No. 93,013, filed March 3, 1961, now U.S. Patent No. 3,175,898.

This invention relates to agricultural chemistry and more particularly is concerned with various aqueous mixtures whereby reduced drift loss of aqueous soluble and dispersible insecticides is accomplished in applications of such chemicals.

Generally, biologically active chemicals are applied in agricultural applications through the use of portable spray mechanisms, e.g., ground and aerial spray applicators. However, because of potential damage to adjacent areas through wind drift of the sprayed particles, economical aerial spray techniques can be carried out in many areas only when certain specific atmospheric conditions prevail.

In certain areas, predominantly the west, where checkerboard agriculture is the pattern, this spray drift problem is acute. The seriousness of the problem is emphasized by the existence of laws in many states controlling the use and application of agricultural and horticultural sprays and insecticides.

An example of the problem encountered in the use of insecticides was reported in J. Ag. Food Chem., vol. 7, No. 10, October 1959, p. 679. In the application of DDT (dichloro-diphenyl-trichloroethane) to certain nonerible crops in fields adjacent to alfalfa, the alfalfa was accidentally sprayed. Later the milk from cattle fed on this alfalfa was found to contain residues of the DDT. Edible crops, accidentally sprayed, thus become unfit as fodder for dairy cattle.

Many attempts have been made to solve this problem. Changes have been made in the design of spray nozzles and additives have been used in the attempt to prevent the production of extremely fine particles. The use of additives which thicken the solution, such as Carbapol, a trade-marked polycarboxylic acid product made by B. F. Goodrich Co., and a carboxymethyl cellulose, however, do not effectively inhibit the production of fine particles by the nozzle.

Another attempt at solving this problem is the formation of an invert emulsion. However, there is some difficulty encountered in making such emulsions of the right consistency and the coverage is not as complete as desired when a biologically active chemical is applied in this way. It is to minimize drift during application that the present invention is directed.

It is a principal object of the present invention to reduce the application loss normally encountered because of wind drift of sprayed aqueous solutions of insecticides. Another object of the present invention is to provide an aqueous solution or dispersion of such agricultural chemicals in combination with a swellable polymer whereby substantially reduced drifting of its spray is accomplished. An additional object of the present invention is to provide an aqueous solution or dispersion of such agricultural chemicals in combination with a swellable polymer whereby substantially reduced drifting of its spray is accomplished. An additional object of the present invention is to provide a composition containing an insecticidal commodity which can be successfully administered by aerial application and which does not suffer appreciable spray drift during administration. Other objects and advantages will become apparent hereinafter.

The foregoing and additional objects are accomplished by providing an aqueous dispersion containing an effective quantity of insecticide, i.e. an amount of a water dispersible water soluble insecticide which will effectively kill insects and containing from about 0.10 to about 20 percent by weight or more of a substantially water-insoluble, water-swellable, crosslinked polymer.

Preferably, crosslinked monovalent cation salts of polyacrylic acid, polyacrylamide, or copolymers of acrylamide and acrylic acid are utilized as gelling agents for these solutions and dispersions. With the copolymers of acrylamide and acrylic acid, compositions containing from about 60 to about 75 weight percent of the acrylamide moiety and from about 40 to about 25 weight percent of the acrylic acid constituent ordinarily are used. Preferably when the copolymer is employed as gelling agent, a copolymer of about 70 percent by weight acrylamide and about 30 percent by weight acrylic acid is used. Any crosslinked polymer whose linear analogue is water-soluble can be used, e.g., crosslinked polyglycols having average molecular weights of from about 1000 up to a million or more, cross-linked substantially water-insoluble, water-swellable, sulfonated alkaryl and aromatic polymers, for example, cross-linked sulfonated polyvinyl toluene, and copolymers of such sulfonated alkaryl and aromatic materials with acrylonitrile, alkylacrylonitriles and methacrylates and other cross-linked water-swellable polymers can be employed.

The substantially water-insoluble, water-swellable, crosslinked polyacrylate salts as used in the present invention are prepared by chemical crosslinking as shown in British Patent 719,330 or by subjecting a mixture of a monovalent cation salt of acrylic acid and water to the influences of high-energy ionizing radiation for a period of time sufficient to effect the desired polymerization and the crosslinking of at least a portion of the polymer produced. Generally speaking, the amount of ionizing radiation should be at least 0.5 megarad but greater or lesser amounts may be employed. In any event, the amount of radiation must be great enough to give a swellable polymer which takes in water or aqueous solutions and in so doing increases in volume, but which generally retains its original shape. It is critical to the present invention that the salt-forming cation of such polyacrylate resin be monovalent. Representative examples of monovalent cations include, for example, the alkali metals, i.e., sodium, potassium, lithium, rubidium and cesium, as well as water soluble ammonium and ammonium-like radicals based upon the quaternary nitrogen atom.

While aqueous insecticidal dispersions and solutions containing as low as 0.10 percent based on the weight of the dispersion or solution, of the crosslinked alkali polyacrylate salt or acrylamide and acrylic acid copolymers will show some improvement in spray drift loss of the sprayable aqueous dispersions, it is preferred to use quantities of from about 0.5 to 10.0 percent based on the weight of the dispersion. The amount to be employed in a given instance will depend upon the kind and amount of pesticide to be used. In any event, the amount of crosslinked, water-swellable, water-insoluble polymer should be used such that a dispersion results which contains no substantial amount of free liquid. The dispersions, made up of discrete, elastic particles which do not coalesce on contact, are conveniently characterized by the term "granular liquid." Thus, the dispersions of this invention form a particulate, gelled mass which contain substantially no free liquid.

In the procedure of the present invention, an aqueous solution or dispersion of a water soluble or water dispersible insecticide is provided and a crosslinked polyacrylate salt, a homopolymer or copolymer of acrylamide and acrylic acid mixed with this to provide a swelled-gel. Generally, this mixing is accomplished by merely adding the resin to the aqueous dispersion with agitation, provided that the agitation is not of sufficient magnitude to cause significant shearing of the polymer to particle sizes lower than about 0.05 mm. diameter. Advantageously, the gelled solutions can be prepared by first pulverizing the polymer to a desired particle size, such as will produce a swelled particle within the range of about 0.05 mm. to about 1.0 mm. in diameter, and then mixing the so-prepared powder into the aqueous solution with stirring. It is understood that the amount of swelling of the particles is dependent upon the particular polymer employed and the extent to which the polymer is crosslinked.

Alternatively, chunks of the polymer can be added to an aqueous solution or dispersion of the insecticide. This produces a gel-like mass as the polymer swells. This mass then can be broken up by vigorous stirring to give a gel structure of discrete gelled particles the same as are obtained by adding the pulverized polymer to the aqueous solution.

Another variable which provides still a third alternative of gel preparation is the spray equipment itself. The size of the spray nozzle and the atomizing pressure on it can be varied so that the sprayed particles are sheared to the proper range of sizes while passing through the nozzle. Here the sprayer itself may act also as the stirring device.

The discrete, swelled polymer particles which make up the gel structure of this invention hold the dispersion of chemical. Since the insecticide is integrally bound by the gel structure, it is carried with the gel particles through the spray system and onto the sprayed surface. Advantageously, the sprayed particles are kept within a certain size range of from about 0.05 mm. to about 1.0 mm. and more particularly between about 0.12 mm. and 1.0 mm. although sprayed particles of somewhat larger diameter may be utilized in certain applications.

Quantities of water dispersible insecticides to be employed are those quantities which are effective. By this is meant those quantities which would normally be employed in using such biologically active compositions of the prior art for control and/or destruction of insects since the compositional matter of the present invention usually does not affect the biological activity of the active compound. Understandably, it is essential that the compatibility of the insecticide formulation and the polymer used be considered in the utilization of the invention.

Of course, an admixture of appropriate proportions of a suitable unswelled polymer with a suitable insecticide has utility since this substantially dry mix can be added to water to achieve the results of the present invention.

An unclassified particulate crosslinked polymer resin can be mixed with the insecticide and this mixture then added to water. Alternatively and advantageously the resin first can be screened to a desired particle size; the so-classified polymer can be mixed with the insecticide; and, this mixture then can be placed in water, preferably with stirring, to give the insecticide in a gelled dispersion of preselected swelled particle size.

In these dry mixtures, it is to be understood that the amount of the water-swellable, water-insoluble, crosslinked polymer in the dry mixture is such that the gelled dispersion as produced in water contains from about 0.1 to about 20 weight percent of the dispersion weight of the resin.

The amount of the insecticide in the dry mixture is a predetermined effective quantity shown to produce the desired insecticidal result upon application of the resulting dispersion.

Additionally, if desired, surface active agents, wetting agents and dispersion promoters can be incorporated into the blend to promote wetting and correspondingly to more readily disperse the aqueous insoluble insecticides throughout the gelled product resulting from mixing the dry blend and water.

The following example is given to illustrate the present invention but is not to be construed as limiting the invention thereto.

EXAMPLE

An evaluation of spray drift control using DDT (dichloro-diphenyl-trichloroethane) was carried out as follows:

A box-like wind tunnel structure about 8 feet long, 4 feet wide, 6 feet high at one end and 5 feet high at the other end, was fitted with a variable speed fan in the end wall at the 6 foot high end of the box. At the opposite end of the box, a channel extended upwardly at right angles from the top of the box. A spray nozzle was located in the upper end of this channel. A baffle was positioned within the channel just below the nozzle. This baffle was adjustable to assure that a uniform spray pattern passed into the air stream substantially in the center section (with respect to the side walls) of the box.

Both ends of the box were open and were fitted with horizontal and vertical vanes. These vanes assured that air turbulence was minimized and an air stream of uniform velocity passed through the box during operation.

In operation, an air stream of predetermined velocity was pulled through the box, this being controlled such that there was substantially no turbulence, particularly across the center section of the box into which the spray stream was fed. Spray was produced by forcing a liquid dispersion or solution through the spray nozzle by means of a pressurized inert gas, e.g. nitrogen pressure.

The distance that spray droplets drifted laterally along the length of the box before striking the bottom was indicative of the effectiveness of the gelling agent employed, i.e. an indication of spray drift control.

In a specific test with DDT, 300 g. of this insecticide as a 50 percent active wettable powder was dispersed in 10 liters of water to give a concentration of about 1.5 weight percent based on the active ingredient. About 41 grams of a dry, particulate copolymer of about 70 percent acrylamide and about 30 percent acrylic acid, said acid portion having been converted to the potassium salt (~50 to 140 mesh, U.S. Standard Sieve) was stirred into the 10 liters of the aqueous insecticide dispersion. The resulting swelled-gel composition was a granular appearing mass which had substantially no free intersititial liquid between particles. The particle size of the resulting particulate swelled gel ranged from about 0.3 to about 1 millimeter in diameter.

As a control, a second aqueous insecticide solution was prepared using the same concentration of the active component but to which no gelling agent was added.

The resulting dispersions in separate duplicate tests were sprayed under a nitrogen pressure of about 20 pounds per square inch gage into the wind tunnel box. The air velocity through the box for both of the runs was maintained at 4 miles per hour.

The duration of the spray burst in each test was 15 seconds. This provided a total of about 117.5 g. of the dispersion through the nozzle in each test.

Strips of Mylar polyethylene terephthalate resin (1.5 inches wide) were placed across the floor of the wind tunnel at distances of 3, 5 and 7 feet from a line on the floor drawn perpendicular to the side walls and directly below the nozzle. At 8 feet from this line, similarly sized strips of the Mylar resin were suspended across the box at 6 inches, 18 inches and 36 inches above the floor.

Following the spray test, the strips were taken from the box, the sprayed droplets which impinged thereon were washed from the strips and the washings collected. The amount of insecticide present on each strip was determined by chemical analysis of the washings for the insecticide. The amount of insecticide found to be present on each strip in turn is a direct measure of the lateral drift of the spray along the length of the box.

Table 1, which follows, summarizes the results of the present study.

*Table 1*

| Distance of Strip from Line Below Nozzle (feet) | Gelled Dispersion of Insecticide (mg. DDT/strip) | Aqueous Dispersion of Insecticide (Control) (mg. DDT/strip) |
|---|---|---|
| 3 | 5.5 | 23.5 |
| 5 | 3.1 | 12.5 |
| 7 | 1.3 | 7.2 |
| 8 (6 inch elev.) | 1.6 | 5.8 |
| 8 (18 inch elev.) | 1.2 | 4.8 |
| 8 (36 inch elev.) | 0.5 | 2.1 |

These results clearly show the marked reduction in spray drift provided by the gelled dispersion when employed in the present novel process.

In a manner similar to that of the foregoing example, other copolymers of acrylic acid and acrylamide or homopolymers of these materials as well as monovalent salts of polyacrylic acid may be substituted for the copolymer of acrylic acid and acrylamide specifically shown. Ammonium, sodium, potassium, rubidium, cesium, methylammonium, ethylammonium, dimethylammonium, etc., salts of polyacrylic acid can be used as gelling agents with similar results obtained as for those obtained with the depicted copolymer. Also other insecticides including Zectran [4(N,N-dimethylamino)-3,5-xylyl-N-methylcarbamate], Sevin [1-naphthyl-N-methyl carbamate], Phosdrin [O,O-dimethyl-O-(2-carbomethoxy-1-methylvinyl)-phosphate], Toxaphene [chlorinated camphene], Ronnel [O,O - dimethyl - O - (2,4,5 - trichlorophenyl)phosphorothioate] and Dursban [O,O-diethyl-O-(3,5,6-trichloro-2-pyridyl)phosphorothioate] have been used with the acrylamide-acrylic acid copolymer with results similar to those of the above example. Other insecticides can be used such as, for example, dieldrin, aldrin, endrin, tetraethylphosphate, O,O-dimethyl dithiophosphate, O,O- diethyl O-2-(ethylthio) ethyl thiophosphate and O,O-dimethyl dithiophosphate of diethyl mercaptosuccinate and the like. Further, other water-insoluble, water-swellable, crosslinked polymers, e.g., sulfonated crosslinked polyvinyltoluene, and crosslinked copolymers of such sulfonated alkaryl and aromatic materials with acrylonitrile, alkylacrylonitriles and methacrylates and other like crosslinked water-insoluble water-swellable polymers may be substituted for those polymers specifically shown with similar results. Any of the crosslinked, water-swellable, substantially water insoluble polymers as herein suggested can be used as a gelling agent with aqueous dispersions of any insecticide.

Various modifications can be made in the present invention without departing from the spirit and scope thereof, for it is understood that we limit ourselves only as defined in the appended claims.

We claim:
1. A method for reducing spray drift in applying an insecticide which comprises spraying an effective amount of an insecticidal gel, said gel produced by mixing an aqueous dispersion containing an effective amount of an insecticide with a sufficient amount of a crosslinked, water-swellable, water-insoluble polymer to provide a particulate, gelled dispersion of discrete, elastic, non-coalescent particles of said polymer with said aqueous dispersion of said insecticide, said particulate, gelled dispersion having substantially no free liquid, the discrete particles of said gelled dispersion having an effective diameter of from about 0.05 to about 1.0 millimeter.

2. A method for reducing spray drift in applying aqueous dispersions of an insecticide which comprises spraying an effective amount of an insecticidal gel into an area in which control of insects is desired, said gel produced by mixing an aqueous dispersion containing an effective amount of an insecticide with from about 0.2 to about 10 per cent, based on the weight of the total dispersion, of a particulate crosslinked, water-swellable, water-insoluble polymer thereby producing an elastic, non-coalescent, particulate, sprayable gel of discrete, swelled, gel particles having substantially no free liquid, said particles having an effective diameter of from about 0.05 to about 1.0 millimeter.

3. A method for reducing spray drift in applying an insecticide which comprises spraying an effective amount of an insecticidal gel, said gel produced by mixing an aqueous dispersion containing an effective amount of an insecticide with from about 0.2 to about 10 percent, based on the weight of the total dispersion, of a particulate, crosslinked, water-swellable, water-insoluble, copolymer of acrylic acid and acrylamide, the acid portion of said copolymer having been converted to a monovalent alkali salt, thereby producing an elastic, non-coalescent, particulate, sprayable gel of discrete, swelled gel particles having substantially no free liquid, said particles having an effective diameter of from about 0.05 to about 1.0 millimeter.

References Cited by the Examiner

UNITED STATES PATENTS

| 2,442,588 | 6/1948 | D'Alelio | 260—78.5 |
| 2,625,471 | 1/1953 | Mowry et al. | 71—1 |
| 2,651,883 | 9/1953 | Hedrick et al. | 71—1 X |
| 2,651,885 | 9/1953 | Hedrick et al. | 71—1 X |
| 2,652,322 | 9/1953 | Hendrick et al. | 71—2.6 X |
| 2,652,323 | 9/1953 | Mowry et al. | 71—2.6 X |
| 2,703,276 | 3/1955 | Hedrick et al. | 71—1 |
| 2,810,716 | 10/1957 | Markus | 260—78.5 |
| 2,951,753 | 9/1960 | Groves | 71—1 |
| 3,060,084 | 10/1962 | Littler | 71—2.2 |
| 3,062,634 | 11/1962 | Talbert | 71—2.3 X |

FOREIGN PATENTS 758,019    9/1956    Great Britain.

JULIAN S. LEVITT, *Primary Examiner.*